US012586722B2

(12) United States Patent
Kwon et al.

(10) Patent No.: US 12,586,722 B2
(45) Date of Patent: Mar. 24, 2026

(54) MULTILAYER ELECTRONIC COMPONENT

(71) Applicant: SAMSUNG ELECTRO-MECHANICS CO., LTD., Suwon-si (KR)

(72) Inventors: Hyung Soon Kwon, Suwon-si (KR); Hyoung Uk Kim, Suwon-si (KR); Kyung Sik Kim, Suwon-si (KR); Ji Su Hong, Suwon-si (KR); Seung In Baik, Suwon-si (KR); Min Young Choi, Suwon-si (KR); Si Taek Park, Suwon-si (KR); Jong Hwan Lee, Suwon-si (KR); Jae Sung Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 187 days.

(21) Appl. No.: 18/244,696

(22) Filed: Sep. 11, 2023

(65) Prior Publication Data

US 2024/0242884 A1     Jul. 18, 2024

(30) Foreign Application Priority Data

Jan. 16, 2023     (KR) ........................ 10-2023-0006106

(51) Int. Cl.
H01G 4/12          (2006.01)
H01G 4/008        (2006.01)
(Continued)

(52) U.S. Cl.
CPC ........... H01G 4/1227 (2013.01); H01G 4/008 (2013.01); H01G 4/012 (2013.01); H01G 4/30 (2013.01)

(58) Field of Classification Search
CPC ........ H01G 4/30; H01G 4/1227; H01G 4/012; H01G 4/008; H01G 4/248; C04B 35/4682;
(Continued)

(56) References Cited

U.S. PATENT DOCUMENTS 5,877,934 A     3/1999  Sano et al.
9,928,960 B2    3/2018  Nakanishi et al.
(Continued)

FOREIGN PATENT DOCUMENTS

CN         111517780 A        8/2020
JP         H10-172856 A       6/1998
(Continued)

OTHER PUBLICATIONS

Extended European Search Report issued in corresponding European Patent Application No. 23194284.8 dated Sep. 27, 2024.

*Primary Examiner* — Arun Ramaswamy
(74) *Attorney, Agent, or Firm* — MORGAN, LEWIS & BOCKIUS LLP

(57)          ABSTRACT

A multilayer electronic component includes a dielectric layer and internal electrodes; wherein the dielectric layer includes a rare earth element, Mn, and Ti. The rare earth element includes a first rare earth element including Dy and Tb, and a second rare earth element including a rare earth element different from the first rare earth element. The number of moles of the rare earth element is defined as RE, the number of moles of Dy is defined as A1, the number of moles of Tb is defined as A2 based on 100 moles of Ti included in the dielectric layer, and $0.5\ mol \leq RE \leq 0.9\ mol$ and $1 < A2/A1$ are satisfied. The number of moles of the second subcomponent element based on 100 moles of Ti included in the dielectric layer is 0.2 mole or more and 0.5 mole or less.

17 Claims, 6 Drawing Sheets

(51) Int. Cl.
    *H01G 4/012*        (2006.01)
    *H01G 4/30*        (2006.01)

(58) Field of Classification Search
    CPC .... C04B 2235/3206; C04B 2235/3208; C04B
               2235/3224; C04B 2235/3236; C04B
               2235/442; C04B 2235/785
    USPC ........................ 361/301.4, 321.1, 321.4, 311
    See application file for complete search history.

(56)                References Cited

U.S. PATENT DOCUMENTS

| 11,211,181 | B2 | 12/2021 | Kwon et al. | |
| 2007/0135295 | A1 | 6/2007 | Sasabayashi et al. | |
| 2010/0165541 | A1* | 7/2010 | Sasabayashi | H01B 3/12 |
| | | | | 361/313 |
| 2017/0178812 | A1* | 6/2017 | Shimada | H01G 4/248 |
| 2018/0308637 | A1* | 10/2018 | Nishigaki | C04B 41/009 |
| 2020/0251242 | A1 | 8/2020 | Kwon et al. | |
| 2020/0411240 | A1 | 12/2020 | Ham et al. | |
| 2021/0050154 | A1* | 2/2021 | Kang | H01G 4/1209 |

FOREIGN PATENT DOCUMENTS

| JP | 2020-125232 | A | 8/2020 |
| KR | 10-2007-0085205 | A | 8/2007 |
| KR | 10-2020-0096019 | A | 8/2020 |

* cited by examiner

FIRST
DIRECTION

SECOND
DIRECTION

I–I'

FIRST
DIRECTION

THIRD
DIRECTION

II–II'

MULTILAYER ELECTRONIC COMPONENT

CROSS-REFERENCE TO RELATED APPLICATION (S)

This application claims benefit of priority to Korean Patent Application No. 10-2023-0006106 filed on Jan. 16, 2023 in the Korean Intellectual Properties Office, the disclosure of which is incorporated herein by reference in its entirety.

TECHNICAL FIELD

The present disclosure relates to a multilayer electronic component.

BACKGROUND

A multilayer electronic component (MLCC), a multilayer electronic component, may be a chip-type condenser mounted on the printed circuit boards of various electronic products such as imaging devices such as a liquid crystal display (LCD) and a plasma display panel (PDP), a computer, a smartphone, and a mobile phone and charging or discharging electricity.

Such a multilayer ceramic capacitor may be used as a component of various electronic devices as a multilayer ceramic capacitor may have a small size and high capacitance thereof and may be easily mounted. As various electronic devices such as computers and mobile devices have been miniaturized and implemented with high-output, demand for miniaturization and high capacitance multilayer ceramic capacitors has increased.

Recently, rare earth elements may be added to the dielectric material of an MLCC. When rare earth elements are added to $BaTiO_3$, Ba sites may be substituted and electrons may be generated, and vacancy oxygen defects may be effectively reduced, which may be effective in improving reliability. However, when rare earth elements replace Ba sites, a tetragonal structure of $BaTiO_3$ may become unstable and phase transition to the cubic structure becomes easier, such that the Curie temperature Tc may move to a lower temperature and temperature properties may deteriorate.

SUMMARY

An example embodiment of the present disclosure is to provide a multilayer electronic component which may satisfy X6S temperature properties.

An example embodiment of the present disclosure is to provide a multilayer electronic component having improved high temperature reliability.

According to an example embodiment of the present disclosure, a multilayer electronic component includes a body including a dielectric layer and internal electrodes; and external electrodes disposed on the body, wherein the dielectric layer includes Ti, a first subcomponent element including a rare earth element, and a second subcomponent element including Mn. The rare earth element includes a first rare earth element including Dy and Tb, and a second rare earth element including a rare earth element different from the first rare earth element. The number of moles of the rare earth element is defined as RE, the number of moles of Dy is defined as A1, the number of moles of Tb is defined as A2 based on 100 moles of Ti included in the dielectric layer, and $0.5 \text{ mol} \leq RE \leq 0.9 \text{ mol}$ and $1 < A2/A1$ are satisfied. The number of moles of the second subcomponent element based on 100 moles of Ti included in the dielectric layer is 0.2 mole or more and 0.5 mole or less.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Figure 1:
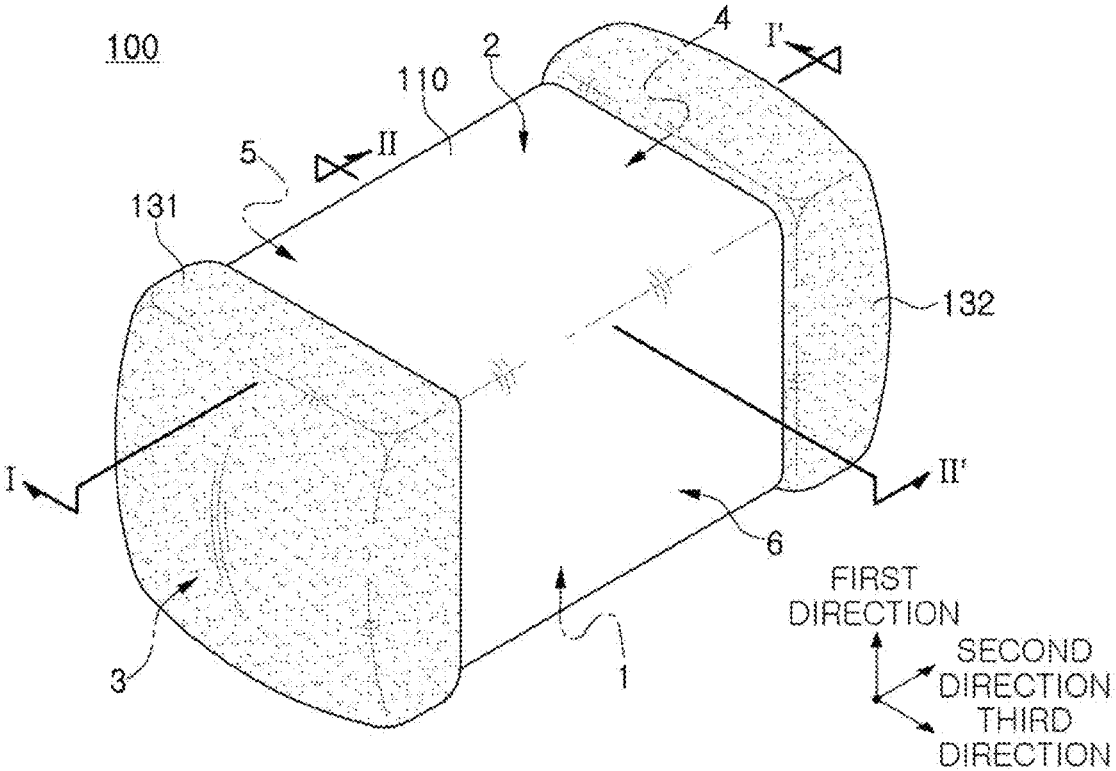
FIG. 1 is a perspective diagram illustrating a multilayer electronic component according to an example embodiment of the present disclosure.

Hereinafter, embodiments of the present disclosure will be described as below with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application.

In the drawings, same elements will be indicated by same reference numerals. Also, redundant descriptions and detailed descriptions of known functions and elements which may unnecessarily make the gist of the present disclosure obscure will not be provided. In the accompanying drawings, some elements may be exaggerated, omitted or briefly illustrated, and the sizes of the elements do not necessarily reflect the actual sizes of these elements. The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

In the drawings, a first direction may be defined as a lamination direction or a thickness T direction, a second direction may be defined as a length L direction, and a third direction may be defined as a width W direction.

Multilayer Electronic Component

FIG. 1 is a perspective diagram illustrating a multilayer electronic component according to an example embodiment.

Figure 2:
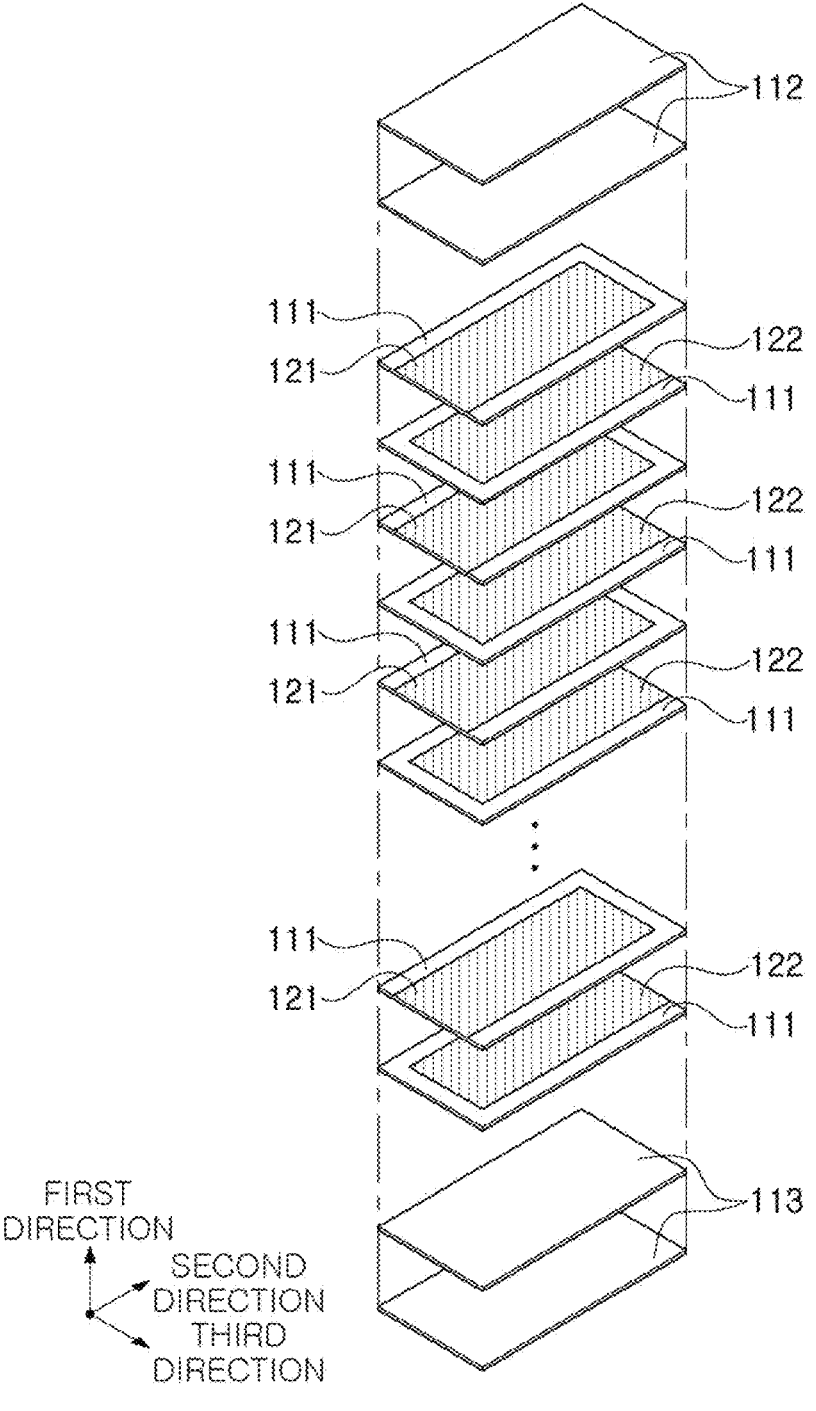
FIG. 2 is an exploded perspective diagram illustrating a laminate structure of internal electrodes according to an example embodiment of the present disclosure.

FIG. 2 is an exploded perspective diagram illustrating a laminate structure of internal electrodes according to an example embodiment.

Figures 3, 4:
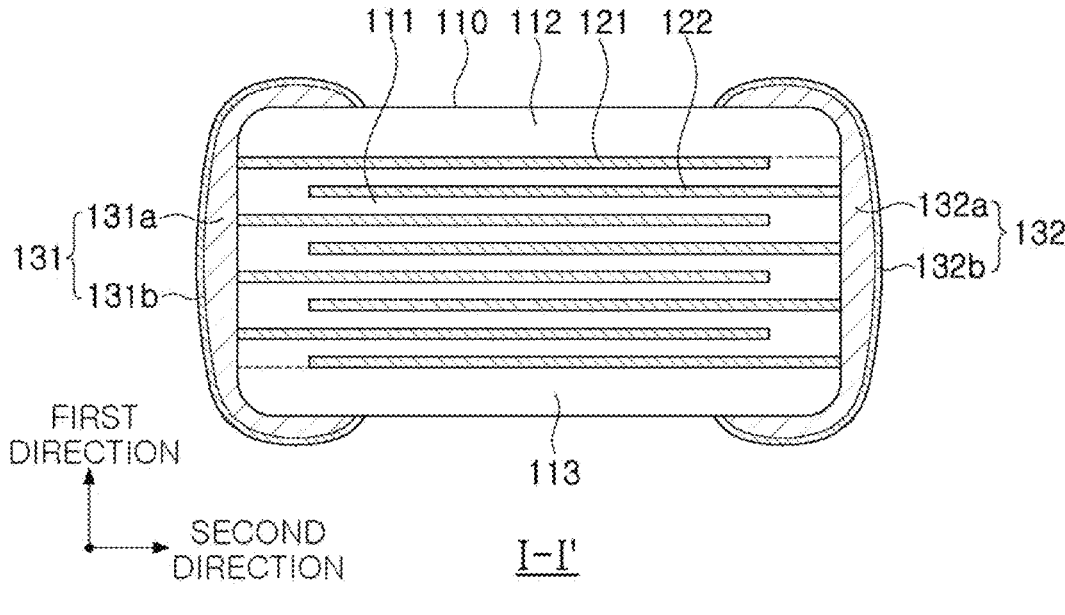
FIG. 3 is a cross-sectional diagram taken along line I-I' in FIG. 1.
FIG. 4 is a cross-sectional diagram taken along line II-II' in FIG. 1.

FIG. 3 is a cross-sectional diagram taken along line I-I' in FIG. 1.

FIG. 4 is a cross-sectional diagram taken along line II-II' in FIG. 1.

Hereinafter, a multilayer electronic component according to an example embodiment will be described in greater detail with reference to FIGS. 1 to 9. A multilayer ceramic capacitor will be described as an example of a multilayer electronic component, but the example embodiment may also be applied to various electronic products using a dielectric composition, such as an inductor, a piezoelectric element, a varistor, or a thermistor.

A multilayer electronic component 100 may include a body 110 including a dielectric layer 111 and internal electrodes 121 and 122; and external electrodes 131 and 132 disposed on the body 110. The dielectric layer 111 may include a first subcomponent element including a rare earth element, a second subcomponent element including Mn, and Ti. The rare earth element may include a first rare earth element including Dy and Tb, and a second rare earth element including a rare earth element different from the first rare earth element. When the number of moles of the rare earth element is defined as RE, the number of moles of Dy is defined as A1, and the number of moles of Tb is defined as A2 based on 100 moles of Ti included in the dielectric layer 111, 0.5 mole≤RE≤0.9 mole and 1<A2/A1 may be satisfied, and the number of moles of the second subcomponent element based on 100 moles of Ti included in the dielectric layer may be greater than or equal to 0.2 moles and less than or equal to 0.5 moles.

In the body 110, the dielectric layers 111 and internal electrodes 121 and 122 may be alternately laminated.

More specifically, the body 110 may include a capacitance forming portion Ac disposed in the body 110 and forming capacitance including first internal electrodes 121 and second internal electrodes 122 alternately disposed to face each other with the dielectric layer 111 interposed therebetween.

The shape of the body 110 may not be limited to any particular shape, but as illustrated, the body 110 may have a hexahedral shape or a shape similar to a hexahedral shape. Due to reduction of ceramic powder included in the body 110 during a firing process, the body 110 may not have an exact hexahedral shape formed by linear lines but may have a substantially hexahedral shape.

The body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

The plurality of dielectric layers 111 forming the body 110 may be in a fired state, and a boundary between the adjacent dielectric layers 111 may be integrated with each other such that the boundary may not be distinct without using a scanning electron microscope (SEM).

A raw material for forming the dielectric layer 111 is not limited to any particular example as long as sufficient capacitance may be obtained. For example, a barium titanate-based material, a lead composite perovskite-based material, or a strontium titanate-based material may be used. The barium titanate material may include $BaTiO_3$ ceramic powder, and an example of the ceramic powder may include $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) or $Ba(Ti_{1-y}Zr_y)O_3$ (0<y<1) in which Ca (calcium), Zr (zirconium) is partially solid-solute.

Also, various ceramic additives, organic solvents, binders, dispersants, or the like, may be added to a raw material for forming the dielectric layer 111 in the example embodiment to powder such as barium titanate ($BaTiO_3$).

As the market for MLCC for IT and also MLCC for automotive electronics has expanded, demand for products having high rated voltage and excellent reliability in the same capacitance range has increased. Among MLCC dielectric composition additive elements, the effect of valence fixed acceptor, valence variable acceptor transition metal element, and rare earth element on reliability has already widely known, and generally, a condition with good reliability may be selected through optimization of the composition ratio of dielectric additive elements including these elements. While a base metal electrode (BME) MLCC has been industrialized, composition optimization work to improve reliability has been continuously conducted. However, even with the same dielectric composition, there may be a significant difference in reliability depending on the microstructure, the distribution and solid solution of additive elements, and process conditions.

The dielectrics of high-capacitance BME MLCCs such as the current X5R, X7R, X8R, and Y5V may be based on a material obtained by doping valence fixed acceptors such as Mg and Al and rare earth elements such as Y, Dy, Ho, and Er, which works as donor, in base materials such as $BaTiO_3$ or $(Ba,Ca)(Ti,Ca)O_3$, $(Ba,Ca)(Ti,Zr)O_3$ and $Ba(Ti,Zr)O_3$ in which Ca, Zr are partially dissolved, and adding additives such as valence variable acceptors such as Mn, V, and Cr, extra Ba, and $SiO_2$ or a sintering aid including the elements. Grain growth inhibition and reduction resistance may need to be implemented to realize normal capacitance and insulation properties of high-capacitance MLCC when fired in a reducing atmosphere, and the two effects may be realized by adding an appropriate amount of valence fixed acceptor such as Mg. However, when only a valence fixed acceptor such as Mg is added, the withstand voltage properties and reliability of the dielectric may not be good, and by adding a transition metal element, which is a valence variable acceptor such as Mn and V, and a rare earth element together, the effect of improving withstand voltage and reliability may be obtained. Most of these elements may be co-doped together, and may be employed in the shell region of the $BaTiO_3$ base material grain and may form a core-shell structure to realize stable capacitance properties and reliability depending on the temperature of MLCC. Accordingly, it may be expected that reliability may be good when these additive elements are not segregated while being included in the secondary phase and may need to be well dissolved in a $BaTiO_3$ crystal lattice of the shell region.

Rare earth elements may be added to a MLCC dielectric, which may indicate that, when rare earth elements are added to $BaTiO_3$, electrons may be generated while replacing Ba sites, and vacancy oxygen defects may be effective reduced, which may be effective in improving reliability. However, when rare earth elements replace the Ba site, a tetragonal structure of $BaTiO_3$ may become unstable, and phase transition to the cubic structure may be easily performed, such that the Curie temperature (Tc) may shift to a lower temperature, and temperature properties may be deteriorated.

Accordingly, in an example embodiment, the dielectric layer 111 may include a first subcomponent element including a rare earth element and titanium (Ti), and the rare earth element may include a first rare earth element including Dy and Tb and a second rare earth element including a rare earth element different from the first rare earth element. In this case, when the number of moles of rare earth element based on 100 moles of titanium (Ti) included in the dielectric layer 111 is defined as RE, the number of moles of dysprosium (Dy) as A1, and the number of moles of terbium (Tb) as A2, 0.5 mole≤RE≤0.9 mole and 1<A2/A1 may be satisfied.

In the example embodiment, the rare earth element may include one or more of Gd, Ho, Sm, Y, Er, Ce, Nd, Tm, La, and Yb.

More specifically, the rare earth element may include a first rare earth element including Dy and Tb, and a second rare earth element including a rare earth element different from the first rare earth element.

Here, the second rare earth element may include an element having a similar ionic radius to dysprosium (Dy), and an element which may be substituted for both A-site and B-site in $ABO_3$ perovskite dielectric materials including $BaTiO_3$ may be used. For example, the second rare earth element may include one or more of Gd, Ho, Sm, and Y, but an example embodiment thereof is not limited thereto.

In other words, the first rare earth element may not include Gd, Ho, Sm, and Y, and the second rare earth element may not include Dy and Tb.

When the number of moles RE of the first subcomponent element based on 100 moles of titanium (Ti) included in the dielectric layer 111 is 0.5 mole or more and 0.9 mole or Coefficient less, TCC (Temperature of Capacitance) temperature properties (X6S) and high-temperature reliability may be simultaneously obtained.

Here, when there are a plurality of first subcomponent elements, the number of moles of the first subcomponent element may refer to the total number of moles of the plurality of first subcomponent elements.

When the number of moles RE of the first subcomponent element included in the dielectric layer 111 exceeds 0.9 moles based on 100 moles of titanium (Ti) included in the dielectric layer 111, the number of moles may be advantageous in terms of reliability, but X6S temperature properties may not be satisfied as the Curie temperature (Tc) moves to room temperature. When the number of moles RE of the first subcomponent element is less than 0.5 mole based on 100 moles of titanium (Ti) included in the dielectric layer 111, X6S temperature properties may be satisfied, but high-temperature reliability may deteriorate.

In this case, as for the dielectric layer 111, based on 100 moles of titanium (Ti), the ratio (A2/A1) of the number of moles A1 of dysprosium (Dy) to the number of moles A2 of terbium (Tb) may satisfy 1<A2/A1. In other words, the number of moles A2 of terbium (Tb) per 100 moles of titanium (Ti) may be greater than the number of moles A1 of dysprosium (Dy) per 100 moles of titanium (Ti).

More specifically, when a relatively large number of moles A2 of terbium (Tb) is added compared to the number of moles A1 of dysprosium (Dy) within the content range in which the number of moles RE of the first subcomponent element is 0.5 mol or more and 0.9 mol or less based on 100 moles of titanium (Ti) included in the dielectric layer 111, reliability may improve.

Also, the dielectric layer 111 may further include a second subcomponent element including a variable valence acceptor element, and the number of moles of the second subcomponent element based on 100 moles of titanium (Ti) included in the dielectric layer 111 may be 0.2 mol or more and 0.5 mol or less.

As described above, as the content of the rare earth element increases, the TCC temperature properties may improve, but reliability may deteriorate. To compensate for the decrease in reliability, a valence variable acceptor element may be added.

Here, the valence variable acceptor element, for example, may be preferably Mn, but an example embodiment thereof is not limited thereto, and the valence variable acceptor element may include one or more of Mn, V, Cr, Fe, Ni, Co, and Zn.

When the number of moles of the second subcomponent element is greater than or equal to 0.2 moles and less than or equal to 0.5 moles based on 100 moles of titanium (Ti) included in the dielectric layer 111, X6S temperature properties and high-temperature reliability may be simultaneously satisfied.

When the number of moles of the second subcomponent element exceeds 0.5 mole based on 100 moles of titanium (Ti) included in the dielectric layer 111, an issue of accelerating capacitance aging may occur, and agglomeration may occur due to poor dispersibility of the second subcomponent element, such that reliability may not be greatly improved. When the number of moles of the second subcomponent element is less than 0.2 moles based on 100 moles of titanium (Ti) included in the dielectric layer 111, high-temperature reliability may deteriorate.

Here, capacitance aging may refer to a decrease in capacitance of a multilayer electronic component over time, and may be calculated as an aging rate. The aging rate may be calculated by a well-known general method, and a person skilled in the art may easily calculate the aging rate, and the aging rate according to the calculation result may correspond to a generally well-known slope.

In an example embodiment, the dielectric layer 111 may further include a third subcomponent element including magnesium (Mg), the number of moles of the third subcomponent element based on 100 moles of titanium (Ti) included in the dielectric layer 111 may be 0.01 mole or more and 0.3 mole or less.

When the number of moles of the third subcomponent element based on 100 moles of titanium (Ti) included in the dielectric layer 111 is 0.01 mole or more and 0.3 mole or less, an appropriate amount of oxygen vacancy may be generated, such that X6S temperature properties and high temperature reliability may be improved.

When the number of moles of the third subcomponent element exceeds 0.3 moles based on 100 moles of titanium (Ti) included in the dielectric layer 111, oxygen vacancies may be excessively generated, such that a tetragonal structure of a dielectric material may be destabilized, for example, and high-temperature reliability may be deteriorated, such as a decrease in the Curie temperature (Tc).

In an example embodiment, the dielectric layer 111 may further include a fourth subcomponent element including silicon (Si), the number of moles of the fourth subcomponent element based on 100 moles of titanium (Ti) included in the dielectric layer 111 may be greater than or equal to 1.0 moles and less than or equal to 5.0 moles.

When the number of moles of the fourth subcomponent element based on 100 moles of titanium (Ti) included in the dielectric layer 111 is 1.0 moles or more and 5.0 moles or less, dielectric properties may improve such that firing density may improve.

When the number of moles of the fourth subcomponent element is less than 1.0 moles based on 100 moles of titanium (Ti) included in the dielectric layer 111, firing density may be lowered, such that dielectric properties may deteriorate, and when the number of moles of the fourth subcomponent element is greater than 5.0 moles based on 100 moles of titanium (Ti) included in the dielectric layer 111, sintering may be excessively suppressed and dielectric properties may not be exhibited.

The thickness td of the dielectric layer 111 may not be limited to any particular example.

However, to easily implement a reduced size and high capacitance of the multilayer electronic component 100, the thickness td of the dielectric layer 111 may be 3.0 μm or less. To easily obtain miniaturization and high capacitance of the multilayer electronic component, the thickness of the dielectric layer 111 may be 1.0 μm or less, preferably 0.6 μm or less, and more preferably 0.4 μm or less.

Here, the thickness td of the dielectric layer 111 may refer to an average thickness of the dielectric layer 111 disposed between the first and second internal electrodes 121 and 122.

The thickness td of the dielectric layer 111 may refer to the size of the dielectric layer 111 in the first direction. Also, the thickness td of the dielectric layer 111 may refer to the average thickness td of the dielectric layer 111 and may refer to the average size of the dielectric layer 111 in the first direction.

The average thickness of the dielectric layer 111 may be measured by scanning a cross-section of the body 110 in the first and second directions using a scanning electron microscope (SEM) with a magnification of 10,000. More specifically, an average value may be measured from the thicknesses of the dielectric layer 111 at 30 points spaced apart by an equal distance in the first direction in the scanned image. The 30 points at equal distances may be designated in the active portion Ac. Also, when the average value is measured by extending the measurement of the average value to ten dielectric layers 111, the average thickness of the dielectric layer 111 in the first direction may be further generalized.

The internal electrodes 121 and 122 may be alternately laminated with the dielectric layer 111.

The internal electrodes 121 and 122 may include a first internal electrode 121 and a second internal electrode 122, the first and second internal electrodes 121 and 122 may be alternately disposed to face each other with the dielectric layer 111 included in the body 110 interposed therebetween, and may be exposed to (or be in contact with or extend from) the third and fourth surfaces 3 and 4 of the body 110, respectively.

More specifically, the first internal electrode 121 may be spaced apart from the fourth surface 4 and may be exposed through (or be in contact with or extend from) the third surface 3, and the second internal electrode 122 may be spaced apart from the third surface 3 and may be exposed through (or be in contact with or extend from) the fourth surface 4. The first external electrode 131 may be disposed on the third surface 3 of the body 110 and may be connected to the first internal electrode 121, and the second external electrode 132 may be disposed on the fourth surface 4 of the body 110 and may be connected to the second internal electrode 122.

That is, the first internal electrode 121 may be connected to the first external electrode 131 without being connected to the second external electrode 132, and the second internal electrode 122 may be connected to the second external electrode 132 without being connected to the first external electrode 131. In this case, the first and second internal electrodes 121 and 122 may be electrically separated from each other by the dielectric layer 111 disposed therebetween.

The body 110 may be formed by alternately laminating ceramic green sheets on which the first internal electrodes 121 are printed and ceramic green sheets on which the second internal electrodes 122 are printed, and firing the sheets.

The material for forming the internal electrodes 121 and 122 is not limited to any particular example, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

Also, the internal electrodes 121 and 122 may be formed by printing conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof on a ceramic green sheet. A screen printing method or a gravure printing method may be used as a method of printing the conductive paste for internal electrodes, but an example embodiment thereof is not limited thereto.

The thickness te of the internal electrodes 121 and 122 may not need to be limited to any particular example.

However, to easily implement miniaturization and high capacitance of the multilayer electronic component 100, the thickness te of the internal electrodes 121 and 122 may be 0.6 μm or less, more preferably 0.45 μm or less.

Here, the thickness te of the internal electrodes 121 and 122 may refer to the size of the internal electrodes 121 and 122 in the first direction. Also, the thickness te of the internal electrodes 121 and 122 may refer to the average thickness te of the internal electrodes 121 and 122, and may refer to the average size of the internal electrodes 121 and 122 in the first direction.

The average thickness of the internal electrodes 121 and 122 may be measured by scanning a cross-section of the body 110 in the first direction using a scanning electron with a magnification of 10,000. More microscope (SEM) specifically, an average value may be measured from the thicknesses of the internal electrodes 121 and 122 at 30 points spaced apart by an equal distance in the second direction in the scanned image. The 30 points at equal distances may be designated in the active portion Ac. Also, when the average value is measured by extending the measurement of the average value to ten internal electrodes 121 and 122, the average thickness of the internal electrodes 121 and 122 may be further generalized.

The body 110 may include cover portions 112 and 113 disposed on both end-surfaces of the capacitance forming portion Ac in the first direction.

More specifically, the body 110 may include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by laminating a single dielectric layer 111 or two or more dielectric layers 111 on the upper and lower surfaces of the capacitance forming portion Ac in a first direction, respectively, and may basically prevent damages to the internal electrodes 121 and 122 due to physical or chemical stress.

The upper cover portion 112 and the lower cover portion 113 may not include the internal electrodes 121 and 122 and may include the same material as that of the dielectric layer 111. That is, the upper cover portion 112 and the lower cover portion 113 may include a ceramic material, for example, a barium titanate ($BaTiO_3$) ceramic material.

The thickness tc of the cover portion 112 and 113 may not need to be limited to any particular example.

However, to easily obtain miniaturization and high capacitance of multilayer electronic components, the thickness tc of the cover portions 112 and 113 may be 100 μm or less, preferably 30 μm or less. More preferably, the thickness may be 20 μm or less.

Here, the thickness tc of the cover portion 112 or 113 may refer to the size of the cover portion 112 or 113 in the first direction. Also, the thickness tc of the cover portions 112 and 113 may refer to the average thickness tc of the cover portions 112 and 113, and may refer to the average size of the cover portions 112 and 113 in the first direction.

The average thickness of the cover portions 112 and 113 may be measured by scanning a cross-section of the body 110 in the first and second directions using a scanning electron microscope (SEM) with a magnification of 10,000. More specifically, an average value may be measured from the thicknesses of the cover portion at 30 points spaced apart by an equal distance in the first direction in the scanned image.

Also, the average size of the cover portion in the first direction measured by the above method may be substantially the same as the average size of the cover portion in the first direction in the cross-sections of the body 110 in the first and third directions.

Side margin portions 114 and 115 may be disposed on end-surfaces of the body 110 in the third direction.

More specifically, the side margin portions 114 and 115 may include a first side margin portion 114 disposed on the fifth surface 5 and a second side margin portion 115 disposed on the sixth surface 6 of the body 110. That is, the side margin portions 114 and 115 may be disposed on both end-surfaces of the body 110 in the third direction.

As illustrated, the side margin portions 114 and 115 may refer to a region between both end-surfaces of the first and second internal electrodes 121 and 122 in the third direction and the boundary surface of the body 110 with respect to the cross-section of the body 110 in the first and third directions.

The side margin portions 114 and 115 may basically serve to prevent damages to the internal electrodes 121 and 122 due to physical or chemical stress.

The side margin portions 114 and 115 may be formed by forming internal electrodes 121 and 122 on the ceramic green sheet by applying a conductive paste other than the region in which the side margin portions 114 and 115 are formed, cutting the laminated internal electrodes 121 and 122 to expose the fifth and sixth surfaces 5 and 6 of the body 110 to prevent a step difference caused by the internal electrodes 121 and 122, and laminating a single dielectric layer 111 or two or more dielectric layers 111 in a third direction on both end-surfaces of the capacitance forming portion Ac in the third direction.

The first side margin portion 114 and the second side margin portion 115 may not include the internal electrodes 121 and 122 and may include the same material as that of the dielectric layer 111. That is, the first side margin portion 114 and the second side margin portion 115 may include a ceramic material, for example, a barium titanate (BaTiO$_3$) ceramic material.

Meanwhile, the width wm of the first and second side margin portions 114 and 115 may not need to be limited to any particular example.

However, to easily obtain miniaturization and high capacitance of the multilayer electronic component 100, the width wm of the side margin portions 114 and 115 may be 100 μm or less, preferably 30 μm or less, and may be more preferably 20 μm or less in ultra-small products.

Here, the width wm of the side margin portions 114 and 115 may refer to the size of the side margin portions 114 and 115 in the third direction. Also, the width wm of the side margin portions 114 and 115 may refer to the average width wm of the side margin portions 114 and 115, and the average size of the side margin portions 114 and 115 in the third direction.

The average size of the side margin portion 114 and 115 in the third direction may be measured by scanning a cross-section of the body 110 in the first and third directions using a scanning electron microscope (SEM) with a magnification of 10,000. More specifically, the average size may be an average value measured from the size in the third direction at 30 points spaced apart from each other by an equal distance in the first direction in the scanned image of one of the side margin portions.

In an example embodiment, the ceramic electronic component 100 may have two external electrodes 131 and 132, but the number or shape of the external electrodes 131 and 132 may be varied depending on the forms of the internal electrode 121 and 122 or other purposes.

The external electrodes 131 and 132 may be disposed on the body 110 and may be connected to the internal electrodes 121 and 122.

More specifically, the external electrodes 131 and 132 may be disposed on the third and fourth surfaces 3 and 4 of the body 110, respectively, and may include first and second external electrodes 131 and 132 connected to the first and second internal electrodes 121 and 122, respectively. That is, the first external electrode 131 may be disposed on the third surface 3 of the body and may be connected to the first internal electrode 121, and the second external electrode 132 may be disposed on the fourth surface 4 of the body and may be connected to the second internal electrode 122.

The external electrodes 131 and 132 may be formed of any material having electrical conductivity, such as metal, and a specific material may be determined in consideration of electrical properties and structural stability, and the external electrodes 131 and 132 may have a multilayer structure.

For example, the external electrodes 131 and 132 may include electrode layers 131a and 132a disposed on the body 110 and plating layers 131b and 132b disposed on the electrode layers 131a and 132a.

For a more specific example of the electrode layers 131a and 132a, the electrode layers 131a and 132a may be sintered electrodes including a first conductive metal and glass, or a second conductive metal and resin.

Also, the electrode layers 131a and 132a may have a form in which a plastic electrode and a resin-based electrode are formed in order on the body.

Also, the electrode layers 131a and 132a may be formed by transferring a sheet including a conductive metal onto a body or by transferring a sheet including a conductive metal onto a fired electrode.

A material having excellent electrical conductivity may be used as the conductive metal included in the electrode layers 131a and 132a. For example, the conductive metal may include one or more selected from a group consisting of nickel (Ni), copper (Cu), palladium (Pd), silver (Ag), gold (Au), platinum (Pt), tin (Sn), tungsten (W), titanium (Ti) and alloys thereof, but an example embodiment thereof is not limited thereto. The electrode layers 131a and 132a may be formed by applying a conductive paste prepared by adding glass frit to the conductive metal powder and firing the paste.

The plating layers 131b and 132b may improve mounting properties.

The type of the plating layers 131b and 132b is not limited to any particular example, and single-layer plating layers 131b and 132b including at least one of nickel (Ni), tin (Sn), palladium (Pd), and alloys thereof, and may include a plurality of layers.

For a more specific example of the plating layers 131b and 132b, the plating layers 131b and 132b may be Ni plating layers or Sn plating layers, and Ni plating layers and Sn plating layers may be formed in order on the electrode layers 131a and 132a, or a Sn plating layer, a Ni plating layer, and a Sn plating layer may be formed in order. Also, the plating layers 131b and 132b may include a plurality of Ni plating layers and/or a plurality of Sn plating layers.

The size of the multilayer electronic component 100 in an example embodiment is not limited to any particular example.

However, the effect of the example embodiment may be excellent in a multilayer electronic component 100 having a size of 1005 (length×width, 1.0 mm×0.5 mm) or less to simultaneously obtain miniaturization and high capacitance of the multilayer electronic component.

Although the example embodiments have been described in detail above, the example embodiment is not limited by the above-described embodiments and the accompanying drawings, but is limited by the appended claims. Accordingly, various forms of substitution, modification, and change may be made by those skilled in the art within the scope of the technical spirit of the present disclosure described in the claims, which also falls within the scope of the present disclosure.

Hereinafter, the example embodiment will be described in greater detail through experimental embodiments, but the scope of the present disclosure is not limited to the experimental embodiments.

Embodiment 40 sample chips having a size of 1005 were manufactured and assessed for each test example.

Figure 5A:
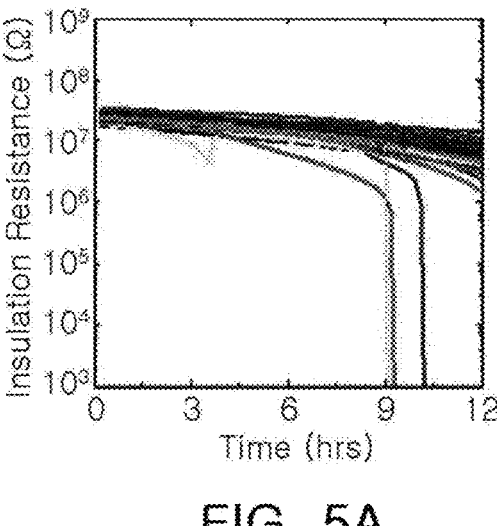
FIGS. 5A to 5C are test graphs of comparative examples and embodiments.
Figure 5B:
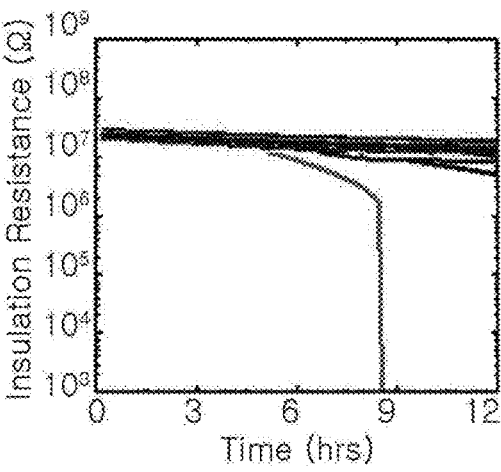
Figure 5C:
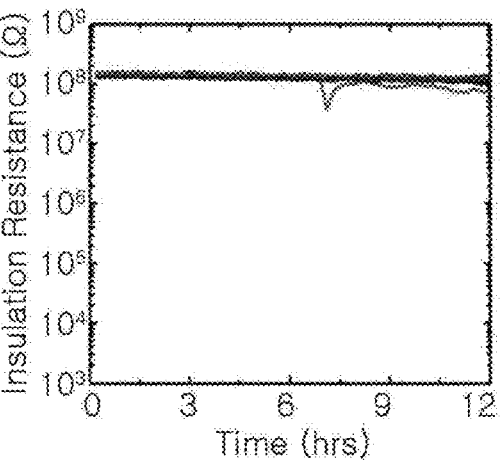

First, FIGS. 5A-5C show graphs obtained by performing a highly accelerated life test (HALT) on 40 sample chips of each of the comparative examples and embodiments.

More specifically, FIG. 5A is a HALT graph when 0.5 mol or more and 0.9 mol or less of the first rare earth element Dy was added, and FIG. 5B is a HALT graph when the first rare earth element Dy and Tb were added in an amount of 0.5 mol or more and 0.9 mol or less. FIG. 5C is a HALT graph when the first rare earth elements Dy, Tb and the second rare earth element were added in an amount of 0.5 mole or more and 0.9 mole or less.

The HALT test was conducted for 12 hours at a temperature condition of 85° C. and a voltage condition of 20 Vr, and the sample in which a short occurred in the insulation resistance IR value based on the initial insulation resistance $IR_0$ was assessed as defective.

In FIG. 5A, 3 samples were defective among 40 sample chips, in FIG. 5B, 1 sample was defective among 40 sample chips, and in FIG. 5C, no sample was defective occurred among the entirety of 40 sample chips.

Accordingly, it may be indicated that, when a second rare earth element is further added in addition to the first rare earth element Dy and/or Tb, high-temperature reliability may be improved.

Table 1 below lists the assessment of whether X6S temperature properties were satisfied according to the sum of the number of moles of Dy and Tb, which are the first rare earth elements, and the number of moles RE2 of the second rare earth element.

As for X6S temperature properties, based on capacitance at 25° C., the sample in which the capacitance change rate (%) at −55° C. to 105° C. satisfied −22% to +22% or less was assessed as O, and the sample in which the capacitance change rate was not satisfied −22% to +22% was assessed as X.

TABLE 1

| | TCC temperature properties | | | |
|---|---|---|---|---|
| Temperature (° C.) | Dy + Tb + RE2 = 0.5 mol | Dy + Tb + RE2 = 0.7 mol | Dy + Tb + RE2 = 0.9 mol | Dy + Tb + RE2 = 1.1 mol |
| −55 | −16.30% | −15.00% | −13.00% | −18.60% |
| 25 | 0 | 0 | 0 | 0 |
| 85 | 7.20% | 8.60% | 5.10% | −2.80% |
| 105 | −16.50% | −17.60% | −20.80% | −27.40% |
| Assessment | O | O | O | X |

When the number of moles of Dy+Tb+RE2 was 0.5 mol or more and 0.9 mol or less, the X6S temperature properties were satisfied, but when the number of moles of Dy+Tb+RE2 was 1.1 mol, the X6S temperature properties were not satisfied.

Accordingly, it may be indicated that when the number of moles of Dy+Tb+RE2 was 0.5 mole or more and 0.9 mole or less, the X6S temperature properties was satisfied.

FIGS. 6A-6D show graphs in which HALT was performed on 40 sample chips of each of comparative examples and embodiments.

Figure 6A:
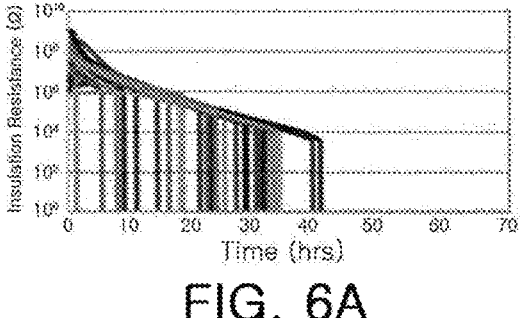
FIGS. 6A to 6D are test graphs of comparative examples and embodiments.
Figure 6B:
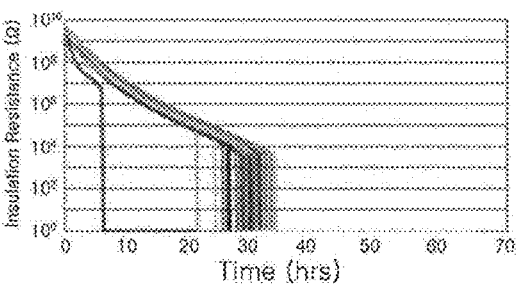
Figure 6C:
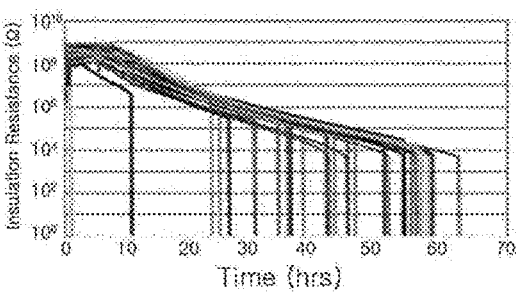
Figure 6D:
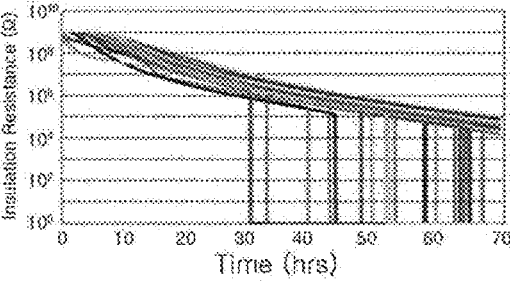

More specifically, in FIG. 6A, the number of moles of Dy+Tb+RE2 was less than 0.5 mole, and 1<Tb/Dy was satisfied. In FIGS. 6B to 6D, the number of moles of Dy+Tb+RE2 satisfied 0.5 mol or more and 0.9 mol or less, in FIG. 6b, Tb/Dy<1 was satisfied, in FIG. 6c, Tb/Dy=1 was satisfied, and in FIG. 6d, 1<Tb/Dy was satisfied.

The HALT test was conducted for 72 hours at a temperature condition of 105° C. and a voltage condition of 15 Vr, and based on the initial insulation resistance $IR_0$, the sample in which the insulation resistance IR value was short-circuited was assessed as defective.

Referring to FIGS. 6B to 6D, when the number of moles of Dy+Tb+RE2 was greater than or equal to 0.5 moles and less than or equal to 0.9 moles, it may be confirmed that as the ratio of Tb/Dy increased, the short circuit time increased. More specifically, when Tb/Dy<1, defects occurred before 40 hours in the entirety of sample chips, and when Tb/Dy=1, it may be confirmed that, among the sample chips, there were chips without defects during the HALT test. Also, referring to FIG. 6A in which 1<Tb/Dy was satisfied, but the number of moles was less than Dy+Tb+RE2 mol, it may be confirmed that defects occurred 50 hours ago for the entirety of sample chips.

Accordingly, it may be indicated that, when 0.5 mole≤Dy+Tb+RE2≤0.9 mole and 1<Tb/Dy was satisfied, high-temperature reliability was improved.

Figure 7A:
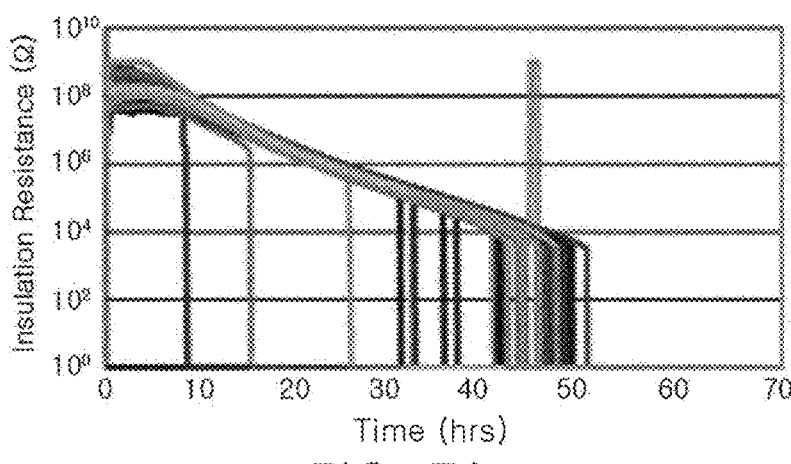
FIGS. 7A to 7C are test graphs of comparative examples and embodiments.
Figure 7B:
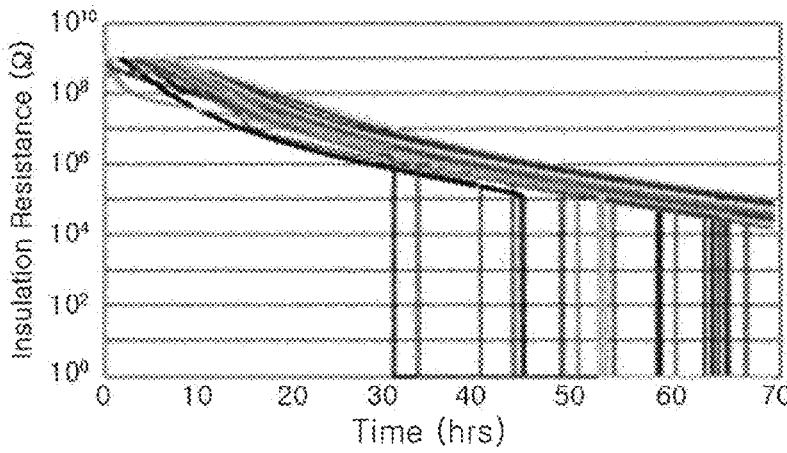
Figure 7C:
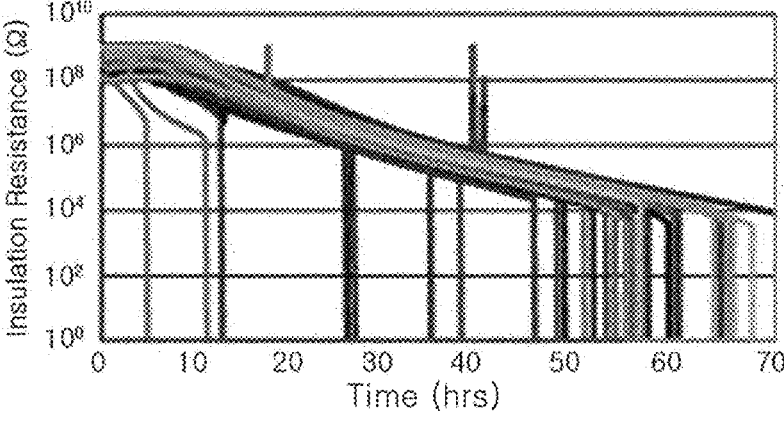

FIGS. 7A-7C show graphs in which HALT was performed on 40 sample chips of each of comparative example and embodiment.

More specifically, in FIGS. 7A to 7C, when 0.5 mole≤Dy+Tb+RE2≤0.9 mole and 1<Tb/Dy was satisfied, in FIG. 7A, the number of moles of Mn was less than 0.2 mole, in FIG. 7B, the number of moles of Mn was greater than or equal to 0.2 moles and less than or equal to 0.5 moles, and in FIG. 7C, the number of moles of Mn was greater than 0.5 moles.

The HALT test was conducted for 72 hours at a temperature condition of 105° C. and a voltage condition of 15 Vr, and based on the initial insulation resistance IR0, the sample in which the insulation resistance IR value was short-circuited was assessed as defective.

The aging rate was assessed for each test example, and was calculated as −3.9% in FIG. 7a, −4.2% in FIG. 7B, and −4.7% in FIG. 7C.

The aging rate may refer to a rate of decrease in capacitance over time, and the larger the absolute value, the greater the rate of decrease in capacitance over time, and the aging rate may correspond to one of the indices indicating poor properties.

It was measured that the higher the amount of Mn added, the higher the aging rate. However, when the number of moles of Mn was less than 0.2 mole, the aging rate was excellent, but the HALT test exhibited poor results, confirming that the high temperature reliability was deteriorated. Also, when 0.5 mole<Mn, the aging rate was the lowest, and the short circuit failure time distribution was poor during HALT test, such that reliability was assessed as poor.

In other words, in the case in which 0.5 mol≤ Dy+Tb+RE2≤0.9 mole and 1<Tb/Dy were satisfied, when 0.2 mol≤ Mn≤0.5 mol, high-temperature reliability and capacitance reduction rate over time were improved.

According to the aforementioned example embodiments, the multilayer electronic component may satisfy the X6S capacitance-temperature properties.

Also, the high temperature reliability of multilayer electronic components may be improved.

While the example embodiments have been illustrated and described above, it will be configured as apparent to those skilled in the art that modifications and variations could be made without departing from the scope of the present disclosure as defined by the appended claims.

What is claimed is:

1. A multilayer electronic component, comprising:
a body including a dielectric layer and internal electrodes; and
external electrodes disposed on the body,
wherein the dielectric layer includes Ti, a first subcomponent element including a rare earth element, and a second subcomponent element including Mn,
wherein the rare earth element includes a first rare earth element including Dy and Tb, and a second rare earth element including a rare earth element different from the first rare earth element,
wherein, the number of moles of the rare earth element is defined as RE, the number of moles of Dy is defined as A1, and the number of moles of Tb is defined as A2 based on 100 moles of Ti included in the dielectric layer, and 0.5 mol≤RE≤0.9 mol and 1<A2/A1 are satisfied,
wherein the number of moles of the second subcomponent element based on 100 moles of Ti included in the dielectric layer is 0.2 mole or more and 0.5 mole or less, and
wherein the second rare earth element includes one or more of Gd, Ho and Y.

2. The multilayer electronic component of claim 1,
wherein the dielectric layer further includes a third subcomponent including Mg, and
wherein the number of moles of the third subcomponent element based on 100 moles of Ti included in the dielectric layer is 0.01 mole or more and 0.3 mole or less.

3. The multilayer electronic component of claim 1, wherein the rare earth element further includes one or more of Gd, Ho, Sm, Y, Er, Ce, Nd, Tm, La, and Yb.

4. The multilayer electronic component of claim 1, wherein the second subcomponent element further includes one or more of V, Cr, Fe, Ni, C, and Zn.

5. The multilayer electronic component of claim 1,
wherein the dielectric layer further includes a fourth subcomponent element including Si, and
wherein the number of moles of the fourth subcomponent element based on 100 moles of Ti included in the dielectric layer is 1.0 mole or more and 5.0 mole or less.

6. The multilayer electronic component of claim 1, wherein the dielectric layer includes a plurality of dielectric layers, and a thickness of at least one of the plurality of dielectric layers is 0.45 μm or less.

7. The multilayer electronic component of claim 1, wherein a thickness of at least one of the internal electrodes is 0.45 μm or less.

8. The multilayer electronic component of claim 1, wherein properties of TCC (Temperature Coefficient of Capacitance) in a temperature range of −55° C. to 105° C. is satisfied −22% to +22%.

9. The multilayer electronic component of claim 1, wherein the body includes a capacitance forming portion including the dielectric layer and the internal electrodes alternately disposed with the dielectric layer in a lamination direction, and a cover portion disposed on each of both end surfaces in the lamination direction of the capacitance forming portion.

10. The multilayer electronic component of claim 9, wherein an average thickness of the cover portion in the lamination direction is 20 μm or less.

11. The multilayer electronic component of claim 9, wherein a direction in which the external electrodes are disposed is defined as a length direction, and a side margin portion disposed on each of both end surfaces of the body in a width direction is included.

12. The multilayer electronic component of claim 11, wherein an average thickness of the side margin portion in the width direction is 20 μm or less.

13. The multilayer electronic component of claim 1, wherein one of the external electrodes includes an electrode layer disposed on the body and connected to one or more of the internal electrodes and a plating layer disposed on the electrode layer.

14. The multilayer electronic component of claim 1, wherein RE=A1+A2+RE2, in which RE2 is the number of moles the second rare earth element based on 100 moles of Ti included in the dielectric layer.

15. A multilayer electronic component, comprising:
a body including a dielectric layer and internal electrodes; and
external electrodes disposed on the body, wherein the dielectric layer includes Ti, a first subcomponent element including a rare earth element, and a second subcomponent element including Mn,
wherein the rare earth element includes a first rare earth element including Dy and Tb, and a second rare earth element including a rare earth element different from the first rare earth element, wherein, the number of moles of the rare earth element is defined as RE, the number of moles of Dy is defined as A1, and the number of moles of Tb is defined as A2 based on 100 moles of Ti included in the dielectric layer, and 0.7 mol≤RE≤0.9 mol and 1<A2/A1 are satisfied, and
wherein the number of moles of the second subcomponent element based on 100 moles of Ti included in the dielectric layer is 0.2 mole or more and 0.5 mole or less, wherein the dielectric layer further includes a third sub-component including Mg, and wherein the number of moles of the third subcomponent element based on 100 moles of Ti included in the dielectric layer is 0.01 mole or more and 0.3 mole or less.

16. The multilayer electronic component of claim 15, wherein the rare earth element includes one or more of Gd, Ho, Sm, Y, Er, Ce, Nd, Tm, La, and Yb.

17. The multilayer electronic component of claim 16, wherein the second rare earth element includes one or more of Gd, Ho, Sm, and Y.

* * * * *